United States Patent [19]

Sugio et al.

[11] Patent Number: 4,503,186

[45] Date of Patent: Mar. 5, 1985

[54] CURABLE RESIN COMPOSITION

[75] Inventors: Akitoshi Sugio, Saitama; Masanobu Masu, Tokyo; Masatugu Matunaga, Ibaraki; Hidenori Kimpara, Tokyo, all of Japan

[73] Assignee: Mitsubishi Gas Chemical Company, Inc., Tokyo, Japan

[21] Appl. No.: 353,208

[22] Filed: Mar. 1, 1982

[30] Foreign Application Priority Data

Mar. 5, 1981 [JP] Japan .................................. 56-31859

[51] Int. Cl.³ ............................................ C08L 51/08
[52] U.S. Cl. ...................................... 525/63; 525/391; 525/392; 525/394; 525/905
[58] Field of Search ................. 525/63, 391, 392, 905, 525/394

[56] References Cited

FOREIGN PATENT DOCUMENTS 145127 9/1982 Japan .

Primary Examiner—Jacob Ziegler
Attorney, Agent, or Firm—Browdy and Neimark

[57] ABSTRACT

A curable resin composition comprising (a) a polyphenylene resin, (b) a maleimide compound and/or a cyanate ester compound and (c) at least one compound selected from the group consisting of compounds having one or more acryloyl, methacryloyl, acryloxy or methacryloxy groups is disclosed. The curable resin composition can give a cured resin having resistance to heat, solvent and moisture and adhering property.

10 Claims, No Drawings

CURABLE RESIN COMPOSITION

BACKGROUND OF THE INVENTION

This invention relates to a curable resin composition from which a cured resin having resistance to heat, solvents and moisture and, adhering property can be prepared.

With the recent advance in electrical and electronics appliances for communication, household and industry, there has been an increasing demand for simplifying methods of mounting such appliances, and accordingly it has been desired to develop electronics materials of light weight and high performance. Various investigations have been undertaken in the field of polymeric materials in order to meet this demand.

In particular, since circuits of higher density have recently been achieved in printed circuit boards, it has been desired to use materials having better heat resistance, dimensional stability or electrical properties. Usually, copper-clad laminated boards based on thermosetting resins such as phenolic resins or epoxy resins are used as the printed circuit boards. The thermosetting resins previously used, however, generally have the defect of poor electrical properties, especially in the high frequency range.

On the other hand, many thermoplastic resins have excellent electrical properties, and attempts have been made to apply heat-resistant thermoplastic resins to electronics instruments and appliances. However, thermoplastic resins are generally inferior to thermosetting resins in heat resistance, solvent resistance, dimensional stability, etc., and their mechanical properties depend largely on temperature. This generally limits the uses of thermoplastic resins.

Polyphenylene ether resins are thermoplastic resins having excellent mechanical and electrical properties, and they exhibit high heat resistance for thermoplastic resins. An attempt was made to produce a copper-clad material having a polyphenylene ether resin as a substrate by utilizing these properties (Japanese Patent Publication (Kohkoku) No. 25394/1976). When this copper-clad material is exposed to high temperatures, however, the resin is degraded and its impact strength or toughness is reduced rapidly. Moreover, with increasing temperature, its mechanical strength is reduced, and the material undergoes deformation. Furthermore, with increasing temperature, the adhesion strength of the copper foil decreases to cause undesirable phenomena such as swelling or peeling. Because of these defects, copper-clad materials based on polyphenylene ether resins have not yet gained commercial acceptance.

Polyphenylene ether resins are also widely used in fields which involve contact with city, agricultural and industrial waters by utilizing their strong resistance to acids, alkalies or hot water. But they have very poor resistance to aromatic hydrocarbons and halogenated hydrocarbons. Some methods have therefore been proposed to increase resistance to organic solvents. They include, for example, a method comprising curing a polyphenylene ether resin using a metal alcoholate as a catalyst (Japanese Patent Publication (Kohkoku) No. 29752/1969); a method comprising adding a crosslinking agent to a polyphenylene ether resin to form a three-dimensional network structure (U.S. Pat. No. 3,396,146); and a method comprising mixing a polyphenylene ether resin with a thermosetting resin, and curing the mixture (Japanese Patent Publication No. 15519/1975). According to these methods, the catalyst, the crosslinking agent or the thermosetting resin is decomposed at high temperatures (required for molding) which are near the melting point of the polyphenylene ether resin. This results in molded articles which are discolored or degenerated or contain foams. Accordingly, these methods have not yet been accepted commercially.

SUMMARY OF THE INVENTION

The present inventors carried out research for obtaining materials for electronics with high performance by using a polyphenylene ether resin having excellent properties. As a result, it was found that when a polyfunctional cyanate ester compound and/or a polyfunctional maleimide compound and an epoxy compound are added to a polyphenylene ether resin for modifying the resin, a curable resin composition not having the above mentioned shotcomings can be obtained. This invention is based on this discovery.

It is an object of this invention to provide a curable resin composition capable of giving a cured resin having much higher solvent resistance than the polyphenylene ether resin while substantially retaining the inherent properties, especially electrical properties, of the polyphenylene ether even if these electrical properties are not improved.

Another object of this invention is to provide a curable resin composition of giving a cured resin having such electrical properties and solvent resistance and exhibiting excellent adhesiveness to a foil of a metal such as copper.

This invention relates to a curable resin composition comprising:

(a) a polyphenylene ether resin [sometimes hereinunder referred to as component (a)]

(b) at least one compound selected from the group consisting of:
  (1) a polyfunctional cyanate ester monomer,
  (2) a prepolymer of (1),
  (3) a coprepolymer of (1) and an amine,
  (4) a polyfunctional maleimide,
  (5) a prepolymer of (4),
  (6) a coprepolymer of (4) and an amine, and
  (7) a coprepolymer of (1) and (4) [sometimes hereinunder referred to as component (b)]

(c) at least one compound selected from the group consisting of compounds having one or more acryloyl or methacryloyl, or acryloxy or methacryloxy groups represented by the formulae

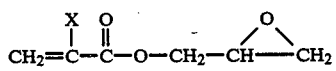

wherein X is hydrogen or methyl;

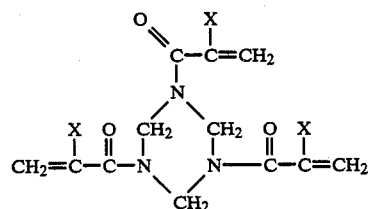

wherein X is as defined above; and

(3)

wherein X is as defined above, $R_1$ is a residue of a polyhydroxy organic compound having 2-70 carbon atoms and n is integer of 2 to 10 [sometimes hereinunder referred to as component (c)], said composition including a mixture of components (a), (b) and (c), a preliminary reaction product of components (a), (b) and (c), the combination of said mixture and said preliminary reaction product, the combination of (a) and the preliminary reaction product of (b) and (c), and the combination of (b) and the preliminary reaction product of (a) and (c).

A curable resin composition of this invention has most of excellent properties which a polyphenylene ether resin has. Particularly, the composition exhibits excellent adhesion and workability.

DETAILED DESCRIPTION OF THE INVENTION

The curable resin composition of this invention can be cured by well known methods. The cured resin obtained by curing the composition is not a mere mixture of components (a), (b) and (c), but is one in which the components are crosslinked with one another. This is proved by the following fact:

80 Wt% of a polyphenylene ether resin, 10 wt% of a polyfunctional maleimide compound, 5 wt% of an acrylic compound, such as 2,2-bis(4-(methacryloxy-poly-(ethyleneoxy)-phenyl))propane and 5 wt% of an epoxy compound were mixed. The resulting composition was compression-molded at 240° C. for two hours to obtain a test sample. Extraction test of the test sample was carried out in chloroform for 24 hours by using a Soxhlet's extractor. Extraction residues of the test sample in chloroform were 65 wt% on the basis of weight of the test sample before testing.

As another embodiment, a composition comprising 50 wt% of a polyphenylene ether resin, 30 wt% of a polyfunctional maleimide compound, 10 wt% of a polyfunctional cyanate ester compound and 10 wt% of an acrylic compound, such as trimethylolpropane trimethacrylate was compression-molded at 240° C. for two hours to obtain a test sample. When the test sample was subjected to extraction test in chloroform for 24 hours by using a Soxhlet's extractor, hardly any materials were extracted from the sample. On the other hand, when a polyphenylene ether resin (compression molded at 240° C. for two hours) was subjected to extraction test under the conditions mentioned above (at 240° C., for two hours and in chloroform), the extraction residue of the resin, that is material not extracted, was less than 1 wt%.

It was beyond expection that a cured resin obtained from a curable resin composition of this invention would show such excellent solvent resistance. In view of the fact that the polyphenylene ether resin has relatively low reactivity, one can hardly imagine that the polyphenylene ether resin would participate in the curing reaction. If the polyphenylene ether resin is in fact not involved in the curing reaction, it is difficult to explain why the solvent extraction of the resin composition of the invention is decreased to such an extent. We presume that the curing reaction of the composition of the invention is a reaction of forming a crosslinked network structure, in which a polyfunctional maleimide and/or a polyfunctional cyanate ester, and an acrylic compound and optionally an epoxy compound participate. The details of the reaction mechanism, however, have not been elucidated.

Polyphenylene ether resins employed in this invention include phenylene ethers obtained by polycondensating a phenol represented by the formula

(4)

wherein $R^2$ is lower alkyl having 1-3 carbon atoms and $R^3$ and $R^4$ are the same or different and are hydrogen or lower alkyl having 1-3 carbon atoms provided that at least one of $R^2$ and $R^4$ is lower alkyl and graft copolymers obtained by graft-polymerizing a vinyl aromatic compound on the above polyphenylene ether. The polyphenylene ether may be homopolymer or copolymers.

Examples of phenols represented by formula (4) include 2,6-dimethylphenol, 2,6-diethylphenol, 2,6-dipropylphenol, 2-methyl-6-ethylphenol, 2-methyl-6-propylphenol, 2-ethyl-6-propylphenol, m-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol and 2,6-dimethyl-3-propylphenol, etc.

Examples of polyphenylene ethers obtained by polycondensating at least one of the above phenols include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly-(2-ethyl-6-propyl-1,4-phenylene)ether, 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer, 2,6-dipropylphenol/2,3,6-trimethylphenol copolymer, styrene/2,6-dimethyl-1,4-phenylene ether graft copolymer in which polystyrene is grafted on poly(2,6-dimethyl-1,4-phenylene) ether and styrene-grafted 2,6-dimethylphenol/2,3,6-trimethyl-phenol copolymer. Particularly, of these polymers and copolymers, poly(2,6-dimethyl-1,4-phenylene)ether, 2,6-dimethylphenol/2,3,6-trimethylphenol copolymer and graft copolymers in which polystyrene is grafted on the polymer or the copolymer are preferable. Desirably, these polyphenylene ether resins have a number average molecular weight of about 1,000 to about 30,000. Polyphenylene ether resins having a relatively low molecular weight have good solubility and lend themselves to good handling, and on the other hand, polyphenylene ether resins having a relatively high molecular weight improve the mechanical properties of the resin composition. Thus, depending upon these properties, the polyphenylene ether resin is properly selected to suit a particular use.

The polyfunctional maleimide compounds employed in the present invention are organic compounds having two or more maleimide groups derived from maleic anhydride and a polyamine and are represented by the following general formula:

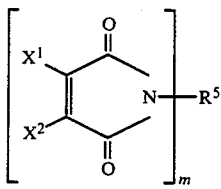  (5)

wherein $R^5$ represents divalent to decavalent aromatic or alicyclic organic group, each of $X^1$ and $X^2$ represent a hydrogen atom, halogen atom or alkyl group, and m represents an integer of 1 to 10.

The maleimides represented by the above formula can be produced by a method known per se which involves reacting maleic anhydride with divalent or more polyamine to form a maleamide acid, and then dehydro-cyclizing the maleamide acid. The maleimide can be produced by known method per se.

Aromatic amines are preferable as the starting polyamines, because the resulting object resin has excellent properties, such as heat-resistance, etc. However, if it is desired that the resulting object resins have only flexibility and pliability, alicyclic amine alone or combination of the alicyclic amines and other amines may be used. Though secondary amines can be used as the starting amine, the primary amines are preferable. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl) cyclohexane, 2,2-bis(4-aminophenyl)propane, 2,2-bis(4-amino-3-methylphenyl)propane, bis(4-amino-3-chlorophenyl)methane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane, melamines having s-triazine ring, and reaction product of formalin and an aniline in which two or more aniline benzene rings bond through methylene group.

Examples of polyfunctional maleimide include 1,3- or 1,4-dimaleimido benzene, 1,3- or 1,4-bis(maleimido methylene) benzene, 1,3- or 1,4-dimaleimido cyclohexane, 1,3- or 1,4-bis(maleimidomethylene)cyclohexane, 4,4'-dimaleimido biphenyl, bis(4-maleimidophenyl)methane, bis(4-maleimidophenyl)ether, bis(4-maleimidophenyl)sulfone, bis(4-maleimido-3-methylphenyl)methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidophenyl)phenylmethane, 3,4-dimaleimidophenyl-4'-maleimidophenylmethane, 1,1-bis(4-maleimidophenyl)-1-phenylmethane, and maleimides derived from melamine and reaction product of formalin and an aniline in which two or more aniline benzene rings bond through methylene group.

The polyfunctional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

By "polyfunctional maleimide compound" in the specification and the claims is meant at least one compound selected from the group consisting of
 (i) a polyfunctional maleimide,
 (ii) a prepolymer of (i) and
 (iii) a coprepolymer of (i) and an amine.

By polyfunctional cyanate ester is meant a compound having at least two cyanate groups in its molecule. The polyfunctional cyanate ester is represented by the formula

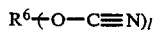  (6)

wherein $R^6$ is an aromatic nucleus-containing residue having 1-10 benzene rings selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R_7$ and $R_8$ are the same or different and each represents a hydrogen atom or an alkyl group containing 1 to 4 carbon atoms, $-O-$, $-CH_2OCH_2-$, $-S-$, $-\overset{O}{\underset{\|}{C}}-$, $-O-\overset{O}{\underset{\|}{C}}-O-$,

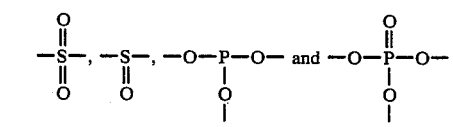

said aromatic nucleus is optionally substituted by a substituent selected from the group consisting of alkyl groups containing 1 to 4 carbon atoms, alkoxy groups, containing 1 to 4 carbon atoms, chlorine and bromine; l is an integer of at least 2 and preferably 2-10, and the cyanate group is always directly bonded to the aromatic nucleus.

Examples of the polyfunctional cyanate ester include 1,3- or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-cyanatophenyl)propane; bis(4-cyanatophenyl)ether; bis(4-cyanatopenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak; cyanated bisphenol type polycarbonate oligomer derived from bisphenol type polycarbonate oligomer and mixture thereof, and polynuclear compounds of benzene obtained by reacting phenol resin and a halogenated cyanide (refer to Japanese Patent Publication (Kohkoku) No. 9433/1980 and U.S. Pat. No. 3,448,079). Other cyanate esters employed in the practice of this invention are given in U.S. Pat. Nos. 3,553,244; 3,740,348; 3,755,402; 3,562,214; British Pat. No. 1,060,933; Japanese Patent Publication (Kohkoku) Nos. 18468/1968; 15516/1971; 26853/1972 and Japanese Patent Publication (Kohkai) No. 63149/1976 which are incorporated herein by reference. Of these cyanate esters, divalent cyanate ester compounds which are derived from divalent phenols, have symmetric structure and do not have any condensed ring in their bridging portion, such as for example, 2,2-bis(4-hydroxyphenyl)propane are preferable, because they are commercially available and give cured product having excellent properties. Polycyanate compounds obtained by reacting a phenol-formaldehyde precondensate with a halogenated cyanide are also satisfactory. The above mentioned cyanate esters may be used as mixtures.

Prepolymers may be used containing a sym-triazine ring which is prepared by the trimerization of the cyanate groups of the cyanate ester, and which have an number average molecular weight of 400 to 6,000. Such prepolymers can be prepared by polymerizing the above cyanate esters in the presence or absence of, as a catalyst, an acid such as a mineral acid or Lewis acid, a base such as sodium hydroxide, a sodium alcoholate or a tertiary amine, a salt such as sodium carbonate or lithirium chloride, or phosphate esters, such as tributyl phosphine.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component.

Amines employed for preparing coprepolymers of the maleimide and the amine can be used in reaction with the cyanate ester compound.

Component (c) employed in this invention is selected from the group consisting of compounds having one or more acryloyl or methacryloyl, or acryloxy or methacryloxy groups represented by the formulae:

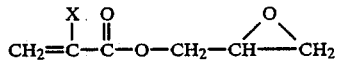

wherein X is hydrogen or methyl;

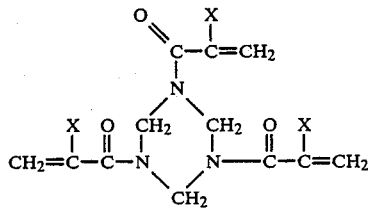

wherein X is as defined above; and

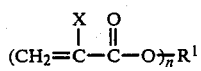

wherein X is as defined above, $R^1$ is a residue of a polyhydroxy organic compound having 2-70 carbon atoms and n is integer of 2 to 10.

Examples of the compounds represented by the formula (1) include glycidyl acrylate and glycidyl methacrylate.

Examples of the compounds represented by the formula (2) include hexahydro-1,3,5-triacryloyl-S-triazine and hexahydro-1,3,5-trimethacryloyl-S-triazine.

Examples of residues of polyhydroxy organic compounds which are $R^1$ in formula (3) include the following:

(i) residues of alkane polyols, such as ethylene glycol, propylene glycol, butanediol, neopentyl glycol, hexanediol, glycerine, trimethylol ethane, trimethylol propane, pentaerythritol, sorbitol, bis(hydroxymethyl)cyclohexane and hydrogenated bisphenol-A;

(ii) residues of polyether polyols, such as diethylene glycol, triethylene glycol, tetraethylene glycol, polyethylene glycol and polypropylene glycol;

(iii) residues of aromatic polyols, such as xylylene glycol, and bisphenol-A in which two or more benzene rings are bonded through a bridging member and addition products of the polyols and alkylene oxides;

(iv) residues of polynuclear product of benzene obtained by reacting phenol with formaldehyde, generally dinuclear to decanuclear products of benzene;

(v) residues of epoxy resins having two or more epoxy groups; and (vi) residues of polyester resins having two or more hydroxy groups at its end positions.

Examples of the compounds represented by the formula (3) include ethylene glycol diacrylate or dimethacrylate, propylene glycol diacrylate or dimethacrylate, 1,3-propanediol diacrylate or dimethacrylate, 1,4-butanediol diacrylate or dimethacrylate, 1,3-butanediol diacrylate or dimethacrylate, 1,5-pentanediol diacrylate or dimethacrylate, neopentyl glycol diacrylate or dimethacrylate, 1,6-hexanediol diacrylate of dimethacrylate, glicerin triacrylate or trimethacrylate, 1,1,1-trimethylolethane diacrylate or dimethacrylate, 1,1,1-trimethylolethane triacrylate or trimethacrylate, 1,1,1-trimethylolpropane diacrylate or dimethacrylate, 1,1,1-trimethylolpropane triacrylate or trimethacrylate, pentaerythritol diacrylate or dimethacrylate, pentaerythritol triacrylate or trimethacrylate, pentaerythritol tetraacrylate or tetramethacrylate, sorbitol tetraacrylate or tetramethacrylate, sorbitol hexaacrylate or hexamethacrylate, sorbitol pentaacrylate or pentamethacrylate, 1,4-hexanediol diacrylate or dimethacrylate, 2,2-bis(acryloyloxy cyclohexane)propane, 2,2-bis(methacryloyloxy cyclohexane)propane, diethylene glycol diacrylate or dimethacrylate, triethylene glycol diacrylate or dimethacrylate, tetraethylene glycol diacrylate or dimethacrylate, polyethylene glycol diacrylate or dimethacrylate, polypropylene glycol diacrylate or dimethacrylate, bisphenol-A diacrylate or dimethacrylate, 2,2-bis(4-(2-acryloxy-ethoxy)phenyl)propane, 2,2-bis(4-(2-methacryloxy-ethoxy)phenyl)propane, 2,2-bis(4-(acryloxy-di-(ethyleneoxy)phenyl))propane, 2,2-bis(4-(methacryloxy-di-(ethyleneoxy)phenyl))propane, 2,2-bis(4-(acryloxy-poly-(ethyleneoxy)phenyl))propane, 2,2-bis(4-(methacryloxy-poly-(ethyleneoxy)phenyl))propane, polyvalent acrylate or methacrylate of phenol resin precondensate, epoxy polyacrylates or polymethacrylates obtained by reacting acrylic acid or methacrylic acid with bisphenol-A type epoxy resin, novolak type epoxy resin, alicyclic epoxy resin, diglycidyl ester of phthalic acid, or reaction product of bisphenol-A type epoxy resin and polycarboxylic acid, or acrylates or methacrylates obtained by reacting polyester having at least two hydroxy groups at its end with acrylic acid or methacrylic acid and mixtures thereof, and halogen-substituents thereof, such as 2,2-dibromomethyl-1,3-propanediol diacrylate or dimethacrylate, and mixtures thereof.

Prepolymers of the above acrylic compounds obtained by prepolymerizing these monomer by organic peroxides, ultraviolet or heat may be used as component (c).

The proportion of components in a curable resin composition of the present invention is not critical. However, the composition may contain component (a) in amount of 2-98 wt%, component (b) in amount of 1-97 wt% and component (c) in amount of 1-60 wt%. The proportion is mainly determined by the use of the composition.

Methods for preparing a curable resin composition of this invention are not critical. The methods may be carried out in the presence or absence of a solvent at room temperature or elevated temperature. The composition may be prepared by merely mixing components (a), (b) and (c). These components may be reacted preliminarily. The composition may be prepared by preliminarily reacting part of the components, followed by adding remainder of the components to the preliminary reaction product.

The curable resin composition of the present invention includes a mixture of components (a), (b) and (c), a preliminary reaction product of components (a), (b) and (c), the combination of said mixture and said preliminary reaction product, the combination of (a) and the preliminary reaction product of (b) and (c), the combination of (b) and the preliminary reaction product of (a) and (c).

The method of curing the resin composition of this invention is not restricted in particular. Usually, it is performed by heating. Generally, a temperature of about 50° to about 400° C., preferably a temperature of about 100° to about 330° C., is selected. The time required for curing differs depending upon the form in which the resin composition of this invention is used, i.e. depending upon whether it is a thin film, or a relatively thick molded article or laminate. Usually, a period sufficient for curing of the resin composition may be selected from the range of 30 seconds to 10 hours. When the resin composition of this invention is to be used molded articles, laminates or bonded structures, it is desirable to apply pressure during the heat curing mentioned above.

The resin composition of this invention may contain various additives for the purpose of controlling the thermosettability of the resulting resin composition, modifying the properties of the resin itself, or imparting the desired properties to the final resin product (cured product). Furthermore, since the resin composition of this invention forms a crosslinked network structure by reaction under heat or pressure, a catalyst may be included into the composition in order to promote the formation of the crosslinked network structure. Examples of the catalysts include organic acid metal salts such as lead naphthenate, lead stearate, zinc octoate, zinc naphthenate, tin oleate, dibutyltin maleate, manganese naphthenate, cobalt naphthenate and a lead salt of resin acid; metal chlorides such as $SnCl_4$, $ZnCl_2$ and $AlCl_3$; and organic bases such as triethylenediamine, radical initiators, such as di-tert.-butyl peroxide, benzoyl peroxide, lauroyl peroxide, dicumyl peroxide and the like. The amount of the catalyst employed depends largely on the type of the catalyst, the curing conditions, or the use of the final cured product. Usually, it is not more than 5% by weight based on the total resin solid.

Other curing methods involve use of ionizing radiation, electron beams from various types of accelerators, gamma-rays from isotopes such as cobalt 60; sun-light; and active energy, for example, light radiated from a light source such as a tungsten lamp, or a low-pressure or high-pressure mercury lamp. In the case of photocuring, the resin composition of this invention may contain up to 5% by weight, based on the resin solid, of a known photosensitizer, for example, an organic carbonyl compound such as benzoin, benzoin methyl ether, benzathrone, anthraquinone and benzophenone, or a combination of a sensitizing dye such as eosine, erythrosine or acridine with an amine. Such a photocurable resin composition containing a photosensitizer is effective in coating applications.

Natural, semi-synthetic or synthetic resins may be incorporated in a curable resin composition of this invention in order to improve chemical or physical properties of coating, laminate or molding obtained from the composition. Examples of such resins are oleoresin such as drying oils and non-drying oils, rosin, shellac, copal, oil-modified rosin, phenolic resin, alkyd resin, epoxy resin, urea resin, melamine resin, polyester resin, vinyl butyral resin, vinyl acetate resin, vinyl chloride resins, acrylic resins, silicone resin and rubbers. They are used singly or as a mixture of two or more. These resins may be used in such an amount that they do not impair the inherent properties of the composition.

Reinforcing materials or fillers in fibrous or powdery form may be incorporated in a curable resin composition of this invention. Examples of the powdery reinforcing materials or fillers are carbon black, finely divided silica, fired clay, basic magnesium silicate, powdery diatomaceous earth, alumina, calcium carbonate, magnesium carbonate, magnesium oxide, kaolin, sericite and boron nitride.

Examples of the fibrous reinforcing material include inorganic fibers such as ceramic fibers, asbestos, rockwool, glass fibers, slag wool and carbon fibers, natural and synthetic fibers such as paper, pulp, wood flour, cotton, linter and polyimide fibers. The fibrous reinforcing materials may be used in the form of chopped fibers, staples, tows, webs, woven fabrics, non-woven fabrics or sheets. The amount of the reinforcing material or the filler varies depending upon the use of the final product. When it is used as a laminating material or molding material, the reinforcing material or the filler may be used in an amount of up to 400 parts by weight per 100 parts by weight of the resin solid. For flame retarding purposes, the resin composition of this invention may also comprise flame retardants known of polyphenylene ether resins, for example, phosphate esters, halogenated organic compounds and combinations for halogen-containing compounds and antimony compounds.

For coloring purposes, a curable resin composition of this invention may include white pigments such as titanium dioxide, and coloring pigments or various organic dyes and pigments, such as lead yellow, carbon black, iron black, molybdenum red, prussian blue, navy blue, cadmium yellow and cadmium red.

When a curable resin composition of this invention is to be used in paint applications, it may contain known paint additives, for example, rust-proofing pigments such as zinc chromate, red lead, red iron oxide, zinc, and strontium chromate; antisagging agents such as aluminum stearate; dispersants; thickeners; film modifying agents; extender pigments; and fire retardants.

The resin composition of this invention can be applied to various uses as mentioned hereinabove. Accordingly, various processing methods can be applied according to the uses. For example, in addition to forming the resin composition into a molded article, the resin composition may be formulated into a paint or an adhesive, which may be coated on a substrate. Or the resin composition may be impregnated into a powdery substrate to form a molding material which is then subjected to shell molding. Or the composition may be impregnated in a fibrous reinforcing material to form a molding material which is then laminated.

The curable resin composition of this invention has most of the properties which a polyphenylene ether resin has and exhibits excellent adhesion, moisture resistance and workability. The composition can be used in the forms of pellet, powder viscous resin not containing any solvent and varnish. The resin composition of this invention finds application in various fields, including paints for rust-proofing, fire and flame retarding and the like purposes, electrical insulating varnishes, adhesives, molding materials, various laminating materials including fiber-reinforced laminates, and materials for printed circuit boards.

The present invention is further illustrated by the following non-limiting Examples and comparative runs.

All percents and parts in these Example and Comparative run are by weight, unless otherwise specified.

EXAMPLE 1 AND COMPARATIVE RUN 1

Polyphenylene ether copolymer (13 parts) (a random copolymer derived from 95 mol% of 2,6-dimethylphenol and 5 mol% of 2,3,6-trimethylphenol on monomer basis) having an intrinsic viscosity, measured at 25° C. in chloroform, of 0.30 dl/g, 1,1,1-trimethylolpropane triacrylate (2 parts) and bis-(4-maleimidophenyl)methane (85 parts) were charged into a Henschel mixer and were uniformly mixed therein. The resulting composition was placed between two copper foils, the gap of the foils being in the range of 1.5–1.6 mm and was compression-molded at 240° C. and 100 Kg/cm$^2$ for 2 hours to obtain two side copper-clad samples. A variety of tests as shown in Table 1 were carried out by using the sample. The results are shown in Table 1.

For comparison, the above procedure was repeated except that the maleimide compound and the acrylic compound were not used. The results are shown in Table 1 as Comparative run 1.

EXAMPLE 2

80 Parts of poly(2,6-dimethyl-1,4-phenylene)ether having an intrinsic viscosity, measured at 25° C. in chloroform, of 0.50 dl/g, 10 parts of the bismaleimide employed in Example 1, 5 parts of 2,2-bis(4-(methacryloxy-poly-(ethyleneoxy)pehnyl))propane (having ethyleneoxy residues of 2.6 on average in its molecule) represented by the formula

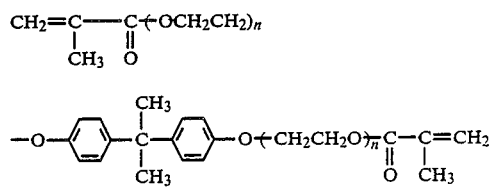

and 5 parts of epoxy resin (ECN-1273 produced by Ciba Geigy AG) were uniformly mixed in a Henschel mixer. The resulting composition was placed between two copper foils, the gap of the foils being of which was in the range of 1.5–1.6 mm and was compression-molded at 250° C. and 100 Kg/cm$^2$ for 2 hours to obtain a two side copper-clad sample. A variety of tests as shown in Table 1 were carried out on the sample. The results are shown in Table 1.

TABLE 1

|  | Composition (Part) | | | | Copper foil peel strength (Kg/cm) | Glass transition (°C.) | Extraction residue by chloroform (%) |
| --- | --- | --- | --- | --- | --- | --- | --- |
|  | Polyphenylene ether resin | Polyfunctional maleimide | Acrylic compound | Epoxy compound | | | |
| Ex. 1 | 13 | 85 | 2 | — | 0.9 | 235 | 100 |
| Ex. 2 | 80 | 10 | 5 | 5 | 1.0 | 230 | 90 |
| comp. run 1 | 100 | — | — | — | 0.9 | 206 | 0 |

EXAMPLE 3

50 Parts of polyphenylene ether copolymer (a random copolymer derived from 95 mol% of 2,6-dimethylphenol and 5 mol% of 2,3,6-trimethylphenol on monomer basis) having an intrinsic viscosity, measured at 25° C. in chloroform, of 0.34 dl/g, 45 parts of 2,2-bis(4-cyanatophenyl)propane and 5 parts of mixture of pentaerythritol triacrylate and pentaerythritol tetraacrylate (Pentaerythritol Triacrylate produced by Osaka Organic Chemical Industry Co., Ltd.) were charged into a Henschel mixer and were uniformly mixed therein. The resulting composition was placed between two copper foils, the gap of the foils being in the range of 1.5–1.6 mm and was compression-molded at 240° C. and 100 Kg/cm$^2$ for 2 hours to obtain a two side copper-clad sample. A variety of tests were carried out by using the sample. The results are as follows:
Copper foil peel strength (Kg/cm): 2.3
Glass transition temperature (°C.): 232
Extraction residue by chloroform (%): 95

EXAMPLE 4

Into an autoclave were charged 100 parts of ethylbenzene and 165 parts of poly(2,6-dimethyl-1,4-phenylene)ether having an intrinsic viscosity, measured at 25° C. in chloroform, of 0.55 dl/g. The mixture was heated to 125° C. and was stirred to allow the polyphenylene ether to be dissolved in ethylbenzene. To the solution were added 7 parts of di-tert.-butylperoxide and 60 parts of styrene. The polyphenylene ether reacted with styrene at 155° C. for 2 hours. The reaction mixture was withdrawn from the autoclave and was dried at 200° C. under a reduced pressure for 2 hours to remove ethylbenzene and unreacted styrene. The resulting product was graft copolymer in which polystyrene was grafted on the polyphenylene ether. The polystyrene content in the copolymer was about 21%.

15 Parts of the above graft copolymer, 30 parts of bismaleimide employed in Example 1, 100 parts of 2,2-bis(4-cyanatophenyl)propane and 0.2 parts of epoxy resin (Epikote 152 produced by Shell Chemical Co., Ltd.) were heated at 160° C. for 5 hours with stirring to obtain prepolymer. 50 Parts of the above prepolymer and 5 parts of 1,6-hexanediol diacrylate were added to a Henschel mixer and were uniformly mixed therein. The resulting composition was placed between two copper foils, the gap of the foils being in the range of 1.5–1.6 mm and was compression-molded at 240° C. and 100 Kg/cm² for 2 hours to obtain two side copper-clad sample. A variety of tests as shown in Table 2 were carried out by using the sample. The results are shown in Table 2.

EXAMPLE 5

20 Parts of poly(phenylmethylene)polymaleimide (having five N-phenylmaleimide groups on an average in the molecule) obtained by reacting maleic anhydride with a poly(phenylmethylene)polyamine obtained by reacting aniline with formaldehyde and 80 parts of 2,2-bis(4-cyanatophenyl)propane were placed in beaker, and reaction of these components was carried out with stirring at 110° C. for 2 hours to obtain prepolymer containing maleimide and cyanate ester.

80 Parts of the prepolymer and 10 parts of polyphenylene ether resin (a random copolymer derived from 95 mol% of 2,6-dimethylphenol and 5 mol% of 2,3,6-trimethylphenol on monomer basis) having an intrinsic viscosity, measured at 25° C. in chloroform, of 0.20 dl/g and 10 parts of glycidyl methacrylate were charged into a Henschel mixer and were uniformly mixed therein. The resulting composition was placed between two copper foils, the gap of the foils being in the range of 1.5–1.6 mm and was compression-molded at 240° C. and 100 Kg/cm² for 2 hours to obtain a two side copper-clad sample. A variety of tests as shown in Table 2 were carried out by using the sample. The results are shown in Table 2.

EXAMPLE 6

25 Parts of polyphenylene ether copolymer (a random copolymer derived from 95 mol% of 2,6-dimethylphenol and 5 mol% of 2,3,6-trimethylphenol on monomer basis) having an intrinsic viscosity, measured at 25° C. in chloroform, of 0.41 dl/g, 50 parts of the bismaleimide employed in Example 1, 15 parts of 2,2-bis(4-cyanatophenyl)propane, 1 part of hexahydro-1,3,5-triacryloyl-s-triazine and 9 parts of epoxy resin (ECN-1273 produced by Ciba Geigy AC) were charged into a Henschel mixer and were uniformly mixed therein. The resulting composition was placed between two copper foils, the gap of the foils being in the range of 1.5–1.6 mm and was compression-molded at 240° C. and 100 Kg/cm² for 2 hours to obtain a two side copper-clad sample. A variety of tests as shown in Table 2 were carried out by using the sample. The results are shown in Table 2.

EXAMPLE 7

10 Parts of the bismaleimide employed in Example 1, 90 parts of 2,2-bis(4-cyanatophenyl)propane, 10 parts of epoxy resin (Eipkote 152 produced by Shell Chemical Co., Ltd.), 5 parts of 1,1,1-trimethylolpropane triacrylate employed in Example 1 and 0.02 parts of zinc octoate (8% Zn) as a catalyst were charged into a reactor and heated at 100° C. for 2 hours with stirring to obtain prepolymer containing the maleimide, the cyanate ester, the acrylic compound and the epoxy compound.

60 Parts of the prepolymer and 40 parts of the polyphenylene ether resin employed in Example 3 were charged into a Henschel mixer and were uniformly mixed therein. The resulting composition was placed between two copper foils, the gap of the foils being in the range of 1.5–1.6 mm and was compression-molded at 240° C. and 100 Kg/cm² for 2 hours to obtain a two side copper-clad sample. A variety of tests as shown in Table 2 were carried out by using the sample. The results are shown in Table 2.

EXAMPLE 8

50 Parts of the polyphenylene ether resin employed in Example 3, 30 parts of poly(phenylmethylene)polymaleimide (having three N-phenylmaleimide groups on an average in the molecule) obtained by reacting maleic anhydride with a poly(phenylmethylene)polyamine obtained by reacting aniline with formaldehyde, 10 parts of prepolymer obtained by heating 2,2-bis(4-cyanatophenyl)propane at 150° C. for 3 hours with stirring, 10 parts of 1,1,1-trimethylolpropane trimethacrylate and 0.1 part of dicumyl peroxide as a catalyst were charged into a Henschel mixer and were uniformly mixed therein. The resulting composition was placed between two copper foils, the gap of the foils being in the range of 1.5–1.6 mm and was compression-molded at 240° C. and 100 Kg/cm² for 2 hours to obtain a two side copper-clad sample. A variety of tests as shown in Table 2 were carried out by using the sample. The results are shown in Table 2.

TABLE 2

| | Composition (Part) | | | | | | | |
|---|---|---|---|---|---|---|---|---|
| Ex. No. | Polyphenylene ether resin | Polyfunctional maleimide | Polyfunctional cyanate ester | Acrylic compound | Epoxy compound | Extraction residue by chloroform (%) | Glass transition temperature (°C.) | Copper foil peel strength (Kg/cm) |
| 4 | 15 | 30 | 49.9 | 5 | 0.1 | 100 | 260 | 2.0 |
| 5 | 10 | 16 | 64 | 10 | — | 100 | 270 | 2.1 |
| 6 | 25 | 50 | 15 | 1 | 9 | 100 | 234 | 1.8 |
| 7 | 40 | 5.2 | 47.0 | 2.6 | 5.2 | 100 | 233 | 2.0 |
| 8 | 50 | 30 | 10 | 10 | — | 100 | 232 | 2.3 |

EXAMPLE 9

25 Parts of poly(2,6-dimethyl-1,4-phenylene)ether having an intrinsic viscosity, measured at 25° C. in chloroform, of 0.33 dl/g, 20 parts of the bismaleimide employed in Example 1, 30 parts of prepolymer of cyanate ester employed in Example 8, 5 parts of 2,2-bis(4-(methacryloxy-poly(ethyleneoxy)phenyl)) propane (having ethyleneoxy residues of 2.6 on average in its molecule) employed in Example 2 and 20 parts of brominated cresol novolak type epoxy compound (bromine content of 36%) were charged into a Henschel mixer and were uniformly mixed therein. The resulting composition was placed between two copper foils, the gap of the foils being in the range of 1.5–1.6 mm and was compression-molded at 200° C. and 100 Kg/cm² for 1 hour to obtain a two side copper-clad sample. A variety of tests were carried out by using the sample. The results are as follows:

Copper foil peel strength (Kg/cm): 1.8;
Flame retardancy (US standard): 94V-1;

EXAMPLE 10

70 Parts of the polyphenylene ether resin employed in Example 3, 15 parts of the bismaleimide employed in Example 1, 10 parts of the prepolymer of cyanate ester employed in Example 8 and 5 parts of pentaerythritol tetraacrylate were charged into a Henschel Mixer and were uniformly mixed therein. The resulting composition was extruded from biaxial extruder (AS-30 produced by Nakatani Machine Manufacturing Co., Ltd.) to obtain pellets. The pellets were compression-molded at 250° C. and 100 Kg/cm² for 2 hours. The resulting sample was cut into 3 mm cube. The sample of 3 mm cube was subjected to extraction test in chloroform form 24 hours by using a Soxhlet's extractor. Extraction residue was 90%.

What is claimed is:

1. A curable resin composition of components comprising:
   (a) a polyphenylene ether resin;
   (b) at least one compound selected from the group consisting of:
      (1) a polyfunctional cyanate ester monomer which is represented by the formula

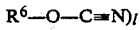

wherein l is an integer of 2 to 10, and R⁶ represents an aromatic organic group having a valence of l, provided that the groups —O—C≡N)ₗ are directly bonded to the aromatic ring of the organic group,
      (2) a prepolymer of (1),
      (3) a coprepolymer of (1) and an amine,
      (4) a coprepolymer of (1) and a polyfunctional maleimide which is represented by the formula

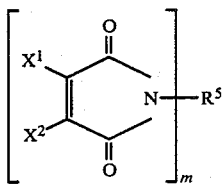

wherein R⁵ represents divalent to decavalent aromatic or alicyclic organic group, each of X¹ and X² represent a hydrogen atom, halogen atom or alkyl group, and m represents an integer of 2 to 10,
      (5) a mixture of at least of (1), (2), (3) and (4) and at least one of said maleimide, a prepolymer of said maleimide, and a coprepolymer of said maleimide and an amine, and
   (c) at least one compound selected from the group consisting of compounds having one or more acryloyl, methacryloyl, acryloxy or methacryloxy groups represented by the formulas

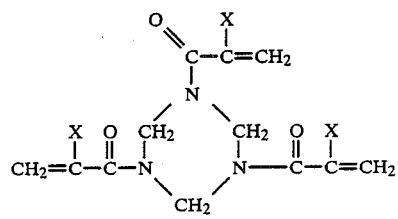

wherein X is as defined above; and

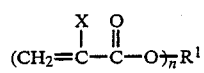

wherein X is as defined above, R¹ is a residue of a polyhydroxy organic compound having 2–70 carbon atoms and n is an integer of 2 to 10,
said composition including at least one of
   (i) a mixture of the components (a), (b) and (c),
   (ii) a preliminary reaction product of the components (a), (b) and (c),
   (iii) a combination of said mixture (i) and said preliminary reaction product (ii),
   (iv) a combination of (a) and a preliminary reaction product of the components (b) and (c), and
   (v) a combination of (b) and a preliminary reaction product of the components (a) and (c).

2. The composition according to claim 1 wherein the polyphenylene ether resin is selected from the group consisting of poly(2,6-dimethyl-1,4-phenylene)ether, poly(2,6-diethyl-1,4-phenylene)ether, poly(2,6-dipropyl-1,4-phenylene)ether poly(2-methyl-6-ethyl-1,4-phenylene)ether, poly(2-methyl-6-propyl-1,4-phenylene)ether, poly(2-ethyl-6-propyl-1,4-phenylene)ether, 2,6-dimethylphenol/2,3,6-trimethyl-phenol copolymer, 2,6-dimethylphenol/2,3,6-triethyl-phenol copolymer, 2,6-diethylphenol/2,3,6-trimethyl-phenol copolymer, 2,6-dipropylphenol/2,3,6-trimethyl-phenol copolymer, styrene/2,6-dimethyl-1,4-phenylene ether graft copolymer in which polystyrene is grafted on poly(2,6-dimethyl-1,4-phenylene)ether and styrene-grafted 2,6-dimethylphenol/2,3,6-trimethyl-phenol copolymer.

3. The composition according to claim 1, wherein the component (b) is (b) (4).

4. The composition according to claim 1, wherein said component (a) is in the range of 2–98% by weight, said component (b) is in the range of 1–97% by weight and said component (c) is in the range of 1–60% by weight.

5. The composition according to claim 1 wherein the polyfunctional cyanate ester is selected from the group consisting of 1,3- or 1,4-dicyanatobenzene; 1,3,5-tricyanatobenzene; 1,3-, 1,4-, 1,6-, 1,8-, 2,6-, or 2,7-dicyanato-naphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro- 4-cyanatophenyl)propane, 2,2-bis(3,5-diblomo-4-cyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(4-chloro-4-cyanatophenyl)methane; cyanated novolak derived from novolak cyanated bisphenol type polycarbonate oligomer derived from bisphenol type polycarbonate oligomer and mixture thereof.

6. The composition according to claim 2, wherein the polyphenylene ether resin is selected from the group consisting of poly(2,6-dimethyl-1,4-phenylene)ether and copolymers derived from 2,6-dimethyl-phenol and 2,3,6-trimethylphenol.

7. The composition according to claim 3 wherein the polyfunctional maleimide is selected from the group consisting of 1,3- or 1,4-dimaleimido benzene, 1,3- or 1,4-bis(maleimido methylene)benzene, 1,3- or 1,4-dimaleimido cyclohexane, 1,3- or 1,4-bis(maleimidomethylene)cyclohexane, 4,4'-dimaleimido biphenyl, bis(4-maleimidophenyl)methane, bis(4-maleimidophenyl)ether, bis(4-maleimidophenyl(sulfone, bis(4-maleimido-3-methylphenyl)methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl)propane, bis(4-maleimidophenyl)phenylmethane, 3,4-dimaleimidophenyl-4'-maleimidophenylmethane, 1,1-bis(4-maleimidophenyl)-1-phenylmethane, and maleimides derived from melamine and reaction product of formalin and an aniline in which two or more aniline benzene rings bond through methylene group.

8. The composition according to claim 4, wherein said component (a) is in the range of 10–80% by weight.

9. The composition according to claim 4, wherein said component (b) is in the range of 10–85% by weight.

10. The composition according to claim 9 wherein the component (b) is (b) (1).

* * * * *